Oct. 12, 1926.  
F. W. MARTIN  
1,602,693  
LOCOMOTIVE DRIVING BOX WEDGE MECHANISM  
Filed March 3, 1925
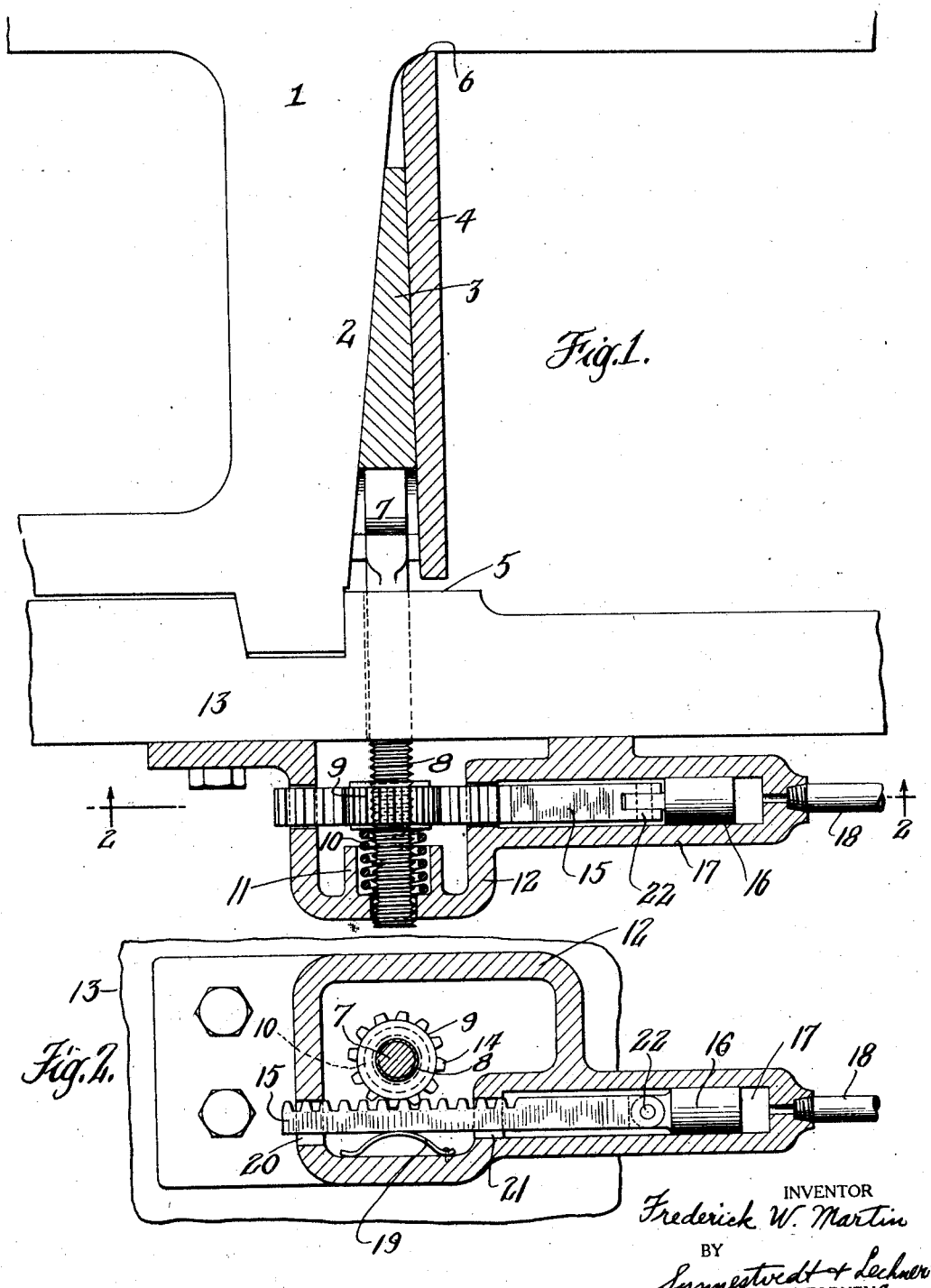

Patented Oct. 12, 1926.

1,602,693

UNITED STATES PATENT OFFICE.

FREDERICK W. MARTIN, OF BROOKLYN, NEW YORK, ASSIGNOR TO FRANKLIN RAILWAY SUPPLY COMPANY, A CORPORATION OF DELAWARE.

LOCOMOTIVE-DRIVING-BOX-WEDGE MECHANISM.

Application filed March 3, 1925. Serial No. 12,904.

This invention has reference to an improved locomotive driver box wedge adjusting device and has for its object the provision of a device of this character which will overcome some of the difficulties encountered in connection with the usual arrangement where all the pressure exerted on the wedge is obtained from a heavy spring directly acting upon the wedge in opposition to the tendency of the pressures exerted by the steam of the engine when working pressure to work the wedge loose.

In the arrangement customarily used it is necessary that the spring employed be of sufficient strength to stand the downward thrust of the wedge resulting from the piston thrust of the locomotive transmitted to the driving box.

This downward pressure due to the taper in the pedestal jaws on the main wheels amounts in some cases to many hundreds of pounds whereas when the engine is drifting or running on short cut-off the amount of this piston thrust is very much reduced. This permits the usual heavy spring to thrust the wedge upward with considerable force and if the surfaces are not properly lubricated there is a tendency for the parts to clamp or stick the box and prevent its sliding up and down freely on the pedestal jaw as intended.

By my present invention I aim to overcome the difficulties referred to and in order that it may be better understood I will now describe the same in conjunction with the accompanying drawing, wherein I have shown in Fig. 1 a side elevation of a wedge device customarily used with my improvement applied thereto, and in Fig. 2 a sectional view on the line 2—2 of Fig. 1.

The usual locomotive frame or more properly a short portion of the same is indicated at 1 and one side of the downwardly projecting pedestal jaws 2 is shown with a movable or adjusting wedge 3 bearing against the floating wedge 4 which has freedom of motion between the surface 5 and the point 6 on the main frame at which the upper end is stopped on its upward movement.

Connected with the lower end of the wedge 3 is the rod 7 which is threaded at 8 to engage a nut 9 which has, bearing against its under side or face, a spring 10 which has its lower end housed within the boss 11 that projects upwardly from the bracket 12 which latter is attached to the bar 13.

The outer periphery of the nut 9 is provided with teeth 14 which are arranged to engage teeth on a rack 15 shown in Fig. 2 the right end of which is coupled with a piston 16 operating in a cylinder 17 that is connected by pipe 18 with some available source of fluid pressure preferably some part of the air brake system. From this a supply of air, preferably at lower pressure thru any suitable reducing valve, may be obtained.

The rack 15 is held in contact with the teeth 14 on the nut 9 by means of a spring 19 and there is sufficient clearance provided at 20 and 21 so that when the rack reaches the extreme left position it can be pushed out of engagement with the teeth and the rack and connected piston 16 moved back again to the right in position for another movement. In order to facilitate this return motion of the rack the same is connected with the piston 16 preferably by a hinge joint 22.

In carrying out my invention I preferably make the spring 10 lighter than is usually employed in automatic wedge adjusting devices, the desirable tension of this spring being just sufficient to properly support the wedge against its weight under normal operation and also to provide a slight amount of tension for forcing the wedge upward but not sufficient to cause binding. The space between the nut 9 and the boss 11 in the bracket 12 is sufficient to allow for a slight downward movement of the adjustable wedge when the floating wedge or member 4 moves down until it strikes the surface at 5. If the thrust of the locomotive piston is sufficient to drive the wedge further down the nut 9 will strike the boss 11 and thus prevent the wedge going down far enough to cause a pound in the driving box.

Air pressure is carried at a reduced amount in the cylinder 17 thru the pipe connection 18, the use of some suitable reducing valve providing a steady pressure considerably below that either in the main reservoir or other part of the air brake system from which the pressure is obtained. The pressure in the cylinder 17 is such that when the spring 10 has carried the adjustable wedge up to compensate for wear so that the tension of the spring has been somewhat reduced, the fluid pressure on the piston 16 will cause it to move to the left revolving the nut 9 around the wedge bolt 8 allowing the nut to move downward and compress the spring. This action will tend to maintain a degree of compression upon the spring at such a point as will serve to balance it with the air pressure acting on the piston 16 so that there will not be at any time more than a slight adjustment movement on the spring but this action will be constant or as it is needed in order to compensate for the wear of the adjustable wedge.

I claim:—

1. A locomotive driving box wedge adjusting device comprising in combination a floating wedge, an adjusting wedge, a spring adapted to exert pressure on the adjusting wedge and a fluid pressure device constructed to exert pressure on said spring.

2. A locomotive driving box wedge adjusting device comprising in combination a floating wedge, an adjusting wedge, a spring adapted to exert pressure on the adjusting wedge and a fluid pressure device constructed to exert pressure on said spring, said fluid pressure device comprising a piston and means for supplying the same with reduced pressure acting in opposition to the wedge adjusting spring.

3. A locomotive driving box wedge adjusting device comprising in combination an adjusting wedge, a screw-threaded rod connected with said wedge, a nut mounted on said threaded rod, a wedge adjusting spring, a rack bar engaging said nut and fluid pressure means for actuating said rack bar.

4. A locomotive driving box wedge adjusting device comprising in combination a floating wedge, an adjusting wedge, a spring adapted to exert pressure on the adjusting wedge and means constructed to exert pressure on said spring.

5. A locomotive driving box wedge adjusting device comprising in combination an adjusting wedge, a spring adapted to exert pressure on the adjusting wedge and means constructed to exert pressure on said spring.

6. A locomotive driving box wedge adjusting device comprising in combination, a spring adapted to exert pressure on the wedge and a fluid pressure actuated device for automatically maintaining a substantially constant pressure on the spring.

In testimony whereof, I have hereunto signed my name.

FREDERICK W. MARTIN.